(12) United States Patent
Ramsdell

(10) Patent No.: US 12,442,984 B2
(45) Date of Patent: Oct. 14, 2025

(54) INTEGRATED CONNECTOR-WAVELENGTH DIVISION MULTIPLEXING DEVICE AND FIBER OPTIC MODULE INCLUDING SUCH DEVICES

(71) Applicant: CORNING RESEARCH & DEVELOPMENT CORPORATION, Corning, NY (US)

(72) Inventor: Scott William Ramsdell, Charlotte, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 52 days.

(21) Appl. No.: 17/946,219

(22) Filed: Sep. 16, 2022

(65) Prior Publication Data

US 2023/0108598 A1 Apr. 6, 2023

Related U.S. Application Data

(60) Provisional application No. 63/251,793, filed on Oct. 4, 2021.

(51) Int. Cl.
| | |
|---|---|
| *G02B 6/293* | (2006.01) |
| *F21V 8/00* | (2006.01) |
| *G02B 6/44* | (2006.01) |
| *H04J 14/02* | (2006.01) |

(52) U.S. Cl.
CPC ......... *G02B 6/2937* (2013.01); *G02B 6/0026* (2013.01); *G02B 6/44526* (2023.05); *G02B 6/44528* (2023.05); *H04J 14/0201* (2013.01)

(58) Field of Classification Search
CPC .. H04J 14/0201; G02B 6/0026; G02B 6/4452
See application file for complete search history.

(56) References Cited

U.S. PATENT DOCUMENTS

| | | | |
|---|---|---|---|
| 10,018,787 B1 * | 7/2018 | Wang | G02B 6/3845 |
| 10,715,271 B1 * | 7/2020 | Cox | H04J 14/0213 |
| 10,809,480 B1 | 10/2020 | Cox et al. | |

(Continued)

FOREIGN PATENT DOCUMENTS

| | | |
|---|---|---|
| CN | 202221485 U | 5/2012 |
| CN | 102804013 A | 11/2012 |

(Continued)

*Primary Examiner* — Pranesh K Barua
(74) *Attorney, Agent, or Firm* — Tamika A. Crawl-Bey

(57) ABSTRACT

An integrated connector-wavelength division multiplexing (WDM) device includes a housing defining a housing interior and a connector interface having at least one ferrule, a device input optical fiber extending from the housing to carry an input optical beam, a device output optical fiber extending from the housing to carry an output optical beam, and a plurality of channel filters positioned in the housing interior. A first channel filter is connected to the input optical fiber and a second channel filter is connected to the output optical fiber, wherein each of the plurality of channel filters is configured to separate at least one optical signal from a plurality of optical signals of the input optical beam and provide the at least one optical signal to the at least one ferrule. A fiber optic module or submodule having one or more integrated connector-WDM devices is also disclosed.

8 Claims, 13 Drawing Sheets

(56) References Cited

U.S. PATENT DOCUMENTS

| | | | |
|---|---|---|---|
| 2001/0055442 A1* | 12/2001 | Whitehead | G02B 6/2937 |
| | | | 385/24 |
| 2009/0103878 A1* | 4/2009 | Zimmel | G02B 6/3825 |
| | | | 385/134 |
| 2009/0196616 A1* | 8/2009 | Bolster | G02B 6/44528 |
| | | | 398/79 |
| 2010/0178020 A1* | 7/2010 | Griffioen | G02B 6/4457 |
| | | | 242/390.5 |
| 2013/0308916 A1 | 11/2013 | Buff et al. | |
| 2014/0226946 A1 | 8/2014 | Cooke et al. | |
| 2014/0248057 A1* | 9/2014 | Li | G02B 6/2938 |
| | | | 398/79 |
| 2018/0156988 A1 | 6/2018 | Gniadek et al. | |
| 2018/0231731 A1* | 8/2018 | Bakatsias | G02B 6/4455 |
| 2018/0275346 A1* | 9/2018 | Li | G02B 27/1006 |
| 2020/0049918 A1* | 2/2020 | Li | G02B 6/4452 |

FOREIGN PATENT DOCUMENTS

| | | |
|---|---|---|
| CN | 104487880 A | 4/2015 |
| CN | 205139428 U | 4/2016 |
| CN | 105516830 B | 3/2019 |
| JP | 2005-257940 A | 9/2005 |
| KR | 100271824 B1 * | 11/2000 |
| WO | 2015/022531 A1 | 2/2015 |
| WO | 2019/195652 A1 | 10/2019 |
| WO | 2021/041686 A1 | 3/2021 |
| WO | 2022/192479 A1 | 9/2022 |

\* cited by examiner

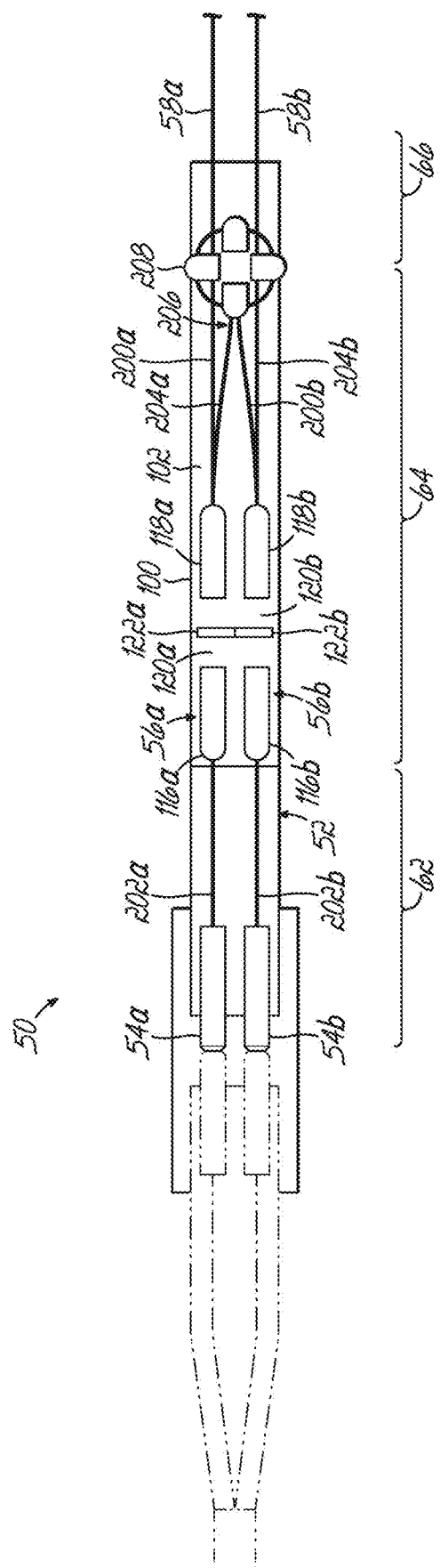
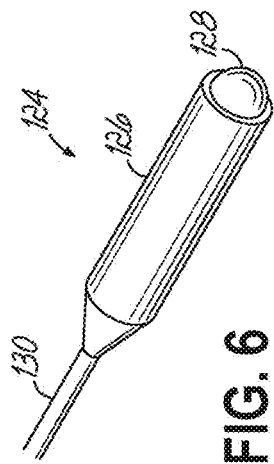
FIG. 5
FIG. 6

INTEGRATED CONNECTOR-WAVELENGTH DIVISION MULTIPLEXING DEVICE AND FIBER OPTIC MODULE INCLUDING SUCH DEVICES

PRIORITY APPLICATION

This application claims the benefit of priority of U.S. Provisional Application No. 63/251,793, filed on Oct. 4, 2021, the content of which is relied upon and incorporated herein by reference in its entirety.

TECHNICAL FIELD

This disclosure relates generally to optical wavelength multiplexing, and more particularly to an integrated connector-wavelength division multiplexing device, and to a fiber optic module having one or more such integrated connector-wavelength division multiplexing devices.

BACKGROUND

Optical fibers are useful in a wide variety of applications, including the telecommunications industry for voice, video, and data transmissions. Benefits of optical fibers include wide bandwidth and low noise operation. However, the need to connect network nodes with fiber optic cables often drives the cost of fiber-optic networks, especially for fiber optic networks having a large geographic footprint.

One way to increase the capacity of existing fiber optic networks while avoiding the need to lay additional fiber optic cables is through Wavelength Division Multiplexing (WDM). WDM involves transmitting data with an optical beam that carries multiple optical signals in a single optical fiber, where each optical signal has a wavelength different from the other optical signals. The single optical fiber transmits the different optical signals simultaneously in the same direction. Thus, the different optical signals provide different channels for data in the single optical fiber, and may be referred to as "signal components," "optical carriers," or "channel signals" of a combined optical signal or "optical beam" carried by the optical fiber. Because of their cost-effectiveness, WDM applications are increasingly being deployed to address the increasing demand for bandwidth.

WDM systems require hardware to combine and separate the different optical signals at different locations in a fiber optic network. Typically, this hardware includes a WDM module (referred to as a multiplexer) that combines the individual optical signals into the optical beam at one network location (transmitter), and another WDM module (referred to as a demultiplexer) that splits the optical beam into the individual optical signals at another network location (receiver). Exemplary WDM modules may be configured to combine or divide the multispectral optical beam into eight (8), twelve (12), twenty-four (24), thirty-six (36), or forty-eight (48) optical signals.

By way of example, FIG. 1 schematically depicts a twenty-four (24) channel Dense Wavelength Division Multiplexing (DWDM) fiber optic module 10, where the separation in wavelength between adjacent optical signals is relatively small, e.g., 0.8/0.4 nm. FIG. 2 illustrates a fiber optic connection arrangement for the twenty-four (24) channel DWDM fiber optic module 10 of FIG. 1, where various input and output fiber optic cables are connected to the front of module 10. An input optical fiber is connected to a common port 12 of the DWDM fiber optic module 10, where the input optical fiber may be configured to carry an optical beam having up to forty-eight (48) optical signals, each having a different wavelength (or wavelength range). The common port 12 is in communication with one or more optical splitters 14a, 14b that divide the optical power into two paths according to the power splitting ratio. The splitter 14b receives an input from both the input and output of the splitter 14a and outputs the received optical beam to test ports 16a, 16b. An output of the splitter 14a is in communication with an express bandpass filter 18. The express bandpass filter 18 is configured to pass an optical beam to an express port 20 and pass an optical beam carrying a plurality of optical signals to an array of channel filters 22 arranged in multiple groups (e.g., three (3) groups of eight (8) channel filters 22).

The array of channel filters 22 includes a plurality of group bandpass filters 24 configured to pass an optical beam for eight (8) adjacent optical signals. By way of example, the group bandpass filter 24 may be an eight-skip-zero (8s0) filter. Such group bandpass filters can perform the function of separating a plurality of adjacent optical signals, e.g., eight (8) optical signals, from the optical beam. The output of the group bandpass filter 24 is in communication with a group of channel filters 22. The channel filters 22 in each group may be a bandpass filter configured to pass a specific optical signal while reflecting the remaining optical signals in the optical beam to the next channel filter 22 in the group. Each of the channel filters 22 are in communication with an output channel connection 26, i.e., a pigtail having an optical fiber that terminates at one end thereof at a connector (such as a suitable duplex connector), that is mated to a respective port at a rear of a bulkhead 28 associated with the DWDM fiber optic module 10 (FIG. 3).

As illustrated in FIG. 2, the DWDM fiber optic module 10 includes channel ports 14-37 at a front portion of the bulkhead 28 corresponding to the twenty-four (24) optical signals carried by the optical beam introduced at the common port 12. The bulkhead 28 is configured to receive fiber optic cables, terminated at an end thereof with suitable connectors, in the channel ports at the front of the bulkhead 28 to form an optical connection with the divided optical signals, as illustrated in FIG. 2. With further reference to FIG. 1, the output of the last group bandpass filter 24 may also be in communication with an upgrade port 30. The upgrade port 30 may enable the optical beam remaining after the last group of channel filters 22 (and carrying additional optical signals) to be passed to a downstream DWDM fiber optic module (not shown) for further division of the optical beam into discrete optical signals (i.e., a serial arrangement of multiple fiber optic modules).

The arrangement shown in FIGS. 1 and 2 requires that the numerous optical components (e.g., channel filters 22, group bandpass filters 24, output channel connectors 26, etc.) be connected to each other to achieve the multiplexing/demultiplexing of the optical beam. As used in this disclosure, optical components being "connected to" each other refers to an optical path being established between the components. The optical connections may be achieved through, for example, a fusion splicing process. Nodes 32 illustrated in FIG. 1 depict locations where optical fibers 36 of the DWDM fiber optic module 10 have been spliced together to form an optical connection for achieving the desired multiplexing/demultiplexing of the optical beam. For example, each channel filter 22 may be associated with at least two fusion splices, and each group bandpass filter 24 may be associated with one or more fusion splices. As is known in the fiber optic industry, the fusion splices may be characterized by relatively long protective sleeves 34 (FIG. 3) designed to shield the splice of the connected optical fibers from damage.

While WDM modules, such as DWDM fiber optic module 10 as described in FIGS. 1 and 2 above, operate for their intended purpose, such modules have a number of drawbacks. For example, such WDM modules are often deployed in tightly confined environments (e.g., cabinets, consoles, etc., collectively referred to as "terminals") where space is at a premium. Current WDM modules, however, are typically large, bulky devices having a relatively large footprint that take up considerable space within the terminals. By way of example, FIG. 3 illustrates the internal arrangement for the twenty-four (24) channel DWDM fiber optic module 10 illustrated in FIGS. 1 and 2 (lid omitted for clarity). As illustrated, the plurality of channel filters 22 may be arranged in separate groups, such as three (3) groups of eight (8) channel filters 22. Each channel filter 22 may include, for example, thin film filters (TFFs). Each TFF includes a filter "chip" designed to accept a multispectral optical beam from an input optical fiber, allow one or more of the optical signals to pass through the filter chip to a first output optical fiber, and reflect the remaining optical signals to a second output optical fiber. The optical signals are directed into their respective output optical fibers via optical collimators. The filter chip and collimators of the TFF are generally provided in a sealed package, which as illustrated in FIG. 3, occupies considerable space within the DWDM fiber optic module 10. Moreover, as noted above, the numerous fusion splices for achieving the desired multiplexing/demultiplexing include protective sleeves 34 that may be gathered in a common region of the DWDM fiber optic module 10. As seen in FIG. 3, the protective sleeves 34 also occupy significant space within the DWDM fiber optic module 10.

Furthermore, the routing of the optical fibers 36 within the DWDM fiber optic module 10 also requires significant space. For example, the optical fibers 36 of the DWDM fiber optic module 10 may be routed in a substantially figure eight pattern, through the fiber routing guides 38, optical filters 22, splice protection sleeves 34, fiber guides 40, and the like. The optical fibers 36 may be routed to minimize bend loss caused by sharp bending, such as by maintaining a bend radius of greater than about 15 mm. In current DWDM designs, the height (H) of the fiber optic module 10 may be about 12 mm. The width (W) of the DWDM fiber optic module 10, e.g., the lateral distance between sides, may be based on the configuration of the bulkhead 28. For example, the depicted DWDM module 10 may include a bulkhead 28 configured to receive 18 duplex fiber connectors (e.g., MDC or SN connectors according to the QSFP-DD Multi-Source Agreement (MSA) Hardware Specification, Rev. 6.01, 2021, and the relevant documents cross-referenced therein). Accordingly, the width of the DWDM fiber optic module 10 may be about 90 mm. The length (L) or depth of the DWDM fiber optic module 10, from the front side to a rear side, may be based on fiber routing and fiber management and may be about 216 mm. Thus, in the illustrated embodiment, the volume defined by the DWDM fiber optic module 10 may be 233,280 mm$^3$. As noted above, such fiber optic modules 10 are considered large and the fiber optic industry desires WDM modules with more compact designs and smaller footprints to better fit within terminals of the fiber optic network.

In addition to their relatively large size, current WDM modules are also labor intensive to manufacture. More particularly, the large number of separate components and the large number of fusion splices (i.e., identified by nodes 32 in FIG. 1) require a significant amount of time and manual effort. Furthermore, because of the manual, labor intensive nature of WDM manufacturing processes, quality and performance of the devices may sometimes be inconsistent, depending on the particular experience and skill of those operators performing the assembly. Thus, there is also a desire to reduce optical components and/or assembly steps in the manufacture of WDM modules to reduce labor requirements and improve reliability.

SUMMARY

An integrated connector-wavelength division multiplexing (WDM) device that combines a connector and a multiplexer into a single, self-contained unit is provided. The integrated connector-WDM device includes a housing defining a body interior and providing a connector interface having at least one ferrule, a device input optical fiber extending from the body and configured to carry an input optical beam having a plurality of optical signals each having a different wavelength, a device output optical fiber extending from the body and configured to carry an output optical beam having a plurality of optical signals each having a different wavelength, and a plurality of channel filters positioned in the body interior. A first channel filter of the plurality of channel filters is connected to the device input optical fiber and a second channel filter of the plurality of channel filters is connected to the device output optical fiber. Each of the plurality of channel filters is configured to separate at least one optical signal from the plurality of optical signals of the device input optical beam and provide the at least one optical signal to the at least one ferrule.

In an exemplary embodiment, each of the plurality of channel filters further includes a first collimator having a filtered optical fiber extending therefrom and connected to the at least one ferrule, a second collimator spaced from the first collimator, and a filter chip disposed in an optical path defined between the first and second collimator. The filter chip is configured to separate the at least one optical signal from the plurality of optical signals and provide the at least one optical signal to the filtered optical fiber. In this embodiment, the second collimator of the first channel filter is connected to the device input optical fiber and the second collimator of the second channel filter is connected to the device output optical fiber. To optically connect adjacent channel filters of the plurality of channel filters, the second collimator of each of the plurality of channel filters is connected to the second collimator of another of the plurality of channel filters by a jumper optical fiber. The jumper optical fiber is preferably devoid of optical splices. In one embodiment, a fiber reel may be positioned in the interior of the body, where the fiber reel is configured to hold windings of the jumper optical fiber as part of a fiber management scheme.

In another embodiment, each of the plurality of channel filters may include a first collimator having a filtered optical fiber extending therefrom and connected to the at least one ferrule and a filter chip aligned with the first collimator, where the filter chip is configured to separate the at least one optical signal from the plurality of optical signals and provide the at least one optical signal to the filtered optical fiber. The first channel filter further includes a second collimator spaced from the first collimator such that the filter chip is disposed in an optical path between the first collimator and the second collimator, and the second collimator is connected to the device input optical fiber. The second channel filter further includes a second collimator spaced from the first collimator such that the filter chip is disposed in an optical path between the first collimator and the second collimator, and the second collimator is connected to the device output optical fiber. To optically connect adjacent channel filters of the plurality of channel filters in this embodiment, each of the plurality of channel filters is connected to another of the plurality of channel filters by an optical reflector.

In an exemplary embodiment, the plurality of channel filters includes only the first channel filter and the second channel filter (i.e., a two-channel multiplexer/demultiplexer). However, an integrated connector-WDM device may have more than two channel filters. For example, in one embodiment, an integrated connector-WDM device may include four (4), six (6), eight (8), twelve (12) or more channel filters. In exemplary embodiments, the connector interface of the body may be configured as an LC duplex connector interface or an MDC duplex connector interface. In alternative embodiments, however, the connector interface may take other configurations depending on the number of ferrules, for example. In an exemplary embodiment, the number of ferrules in the device may be equal to the number of channel filters in the device. For example, the at least one ferrule may be a single fiber ferrule. Alternatively, the at least one ferrule may be configured as a multi-fiber ferrule.

In another embodiment, a wavelength division multiplexing (WDM) module includes a module body defining an interior, a bulkhead at a front portion of the module body, where the bulkhead includes one or more adapters defining a plurality of rear ports accessible from the interior of the module body and a plurality of front ports accessible from an exterior of the module body, and a plurality of integrated connector-WDM devices in the interior of the module body and connected to respective rear ports of the bulkhead. Each of the plurality of integrated connector-WDM devices may be connected to another of the plurality of integrated connector-WDM devices by a jumper optical fiber, for example.

In one embodiment, a plurality of submodules may be positioned in the interior of the module body and include at least one input submodule and a plurality of WDM submodules. The at least one input submodule includes a plurality of group bandpass filters, each of the plurality of group bandpass filters having a bandpass output optical fiber configured to carry an optical beam having a plurality of optical signals each of a different wavelength. Each of the plurality of WDM submodules includes at least one of the integrated connector-WDM devices. In this embodiment, each of the bandpass output optical fibers from the at least one input submodule may be connected to a respective one of the plurality of WDM submodules. Moreover, one or more fiber reels may be positioned in the interior of the module body and be configured to hold windings of one or more of the bandpass output optical fibers.

In yet another embodiment, a method for making a wavelength division multiplexing (WDM) device is provided. The method includes positioning at least one ferrule in a connector body; arranging a plurality of channel filters in the connector body, where a first channel filter of the plurality of channel filters has a device input optical fiber, a second channel filter of the plurality of channel filters has a device output optical fiber, and each of the plurality of channel filters has a filtered optical fiber; connecting the filtered optical fiber from each of the plurality of channel filters to the at least one ferrule and connecting each of the plurality of channel filters to another of the plurality of channel filters.

In one embodiment, connecting each of the plurality of channel filters to the another of the plurality of channel filters includes using a jumper optical fiber to connect each of the plurality of channel filters to the another of the plurality of channel filters. In an alternative embodiment, connecting each of the plurality of channel filters to the another of the plurality of channel filters includes using an optical reflector to connect each of the plurality of channel filters to the another of the plurality of channel filters.

In still a further embodiment, a method of making a wavelength division multiplexing (WDM) module includes providing a plurality of WDM devices according to the aspect above, connecting each of the plurality of WDM devices to a rear port of a bulkhead at a front portion of the module, and connecting each of the plurality of WDM devices to another of the plurality of WDM devices.

In one embodiment, providing the plurality of WDM devices further includes providing a plurality of WDM submodules, where each submodule has a plurality of the WDM devices, and the method further includes providing an input submodule having a plurality of group bandpass filters, each of the plurality of group bandpass filters having a bandpass output optical fiber configured to carry an optical beam having a plurality of optical signals each of a different wavelength, and connecting each of the bandpass output optical fibers to a respective one of the plurality of WDM submodules.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 5 is a schematic cross-sectional view of the integrated connector-WDM device illustrated in FIG. 4 coupled to a bulkhead of a fiber optic module;

FIG. 6 is an exemplary collimator in accordance with one embodiment of the disclosure;

DETAILED DESCRIPTION

Figure 1:
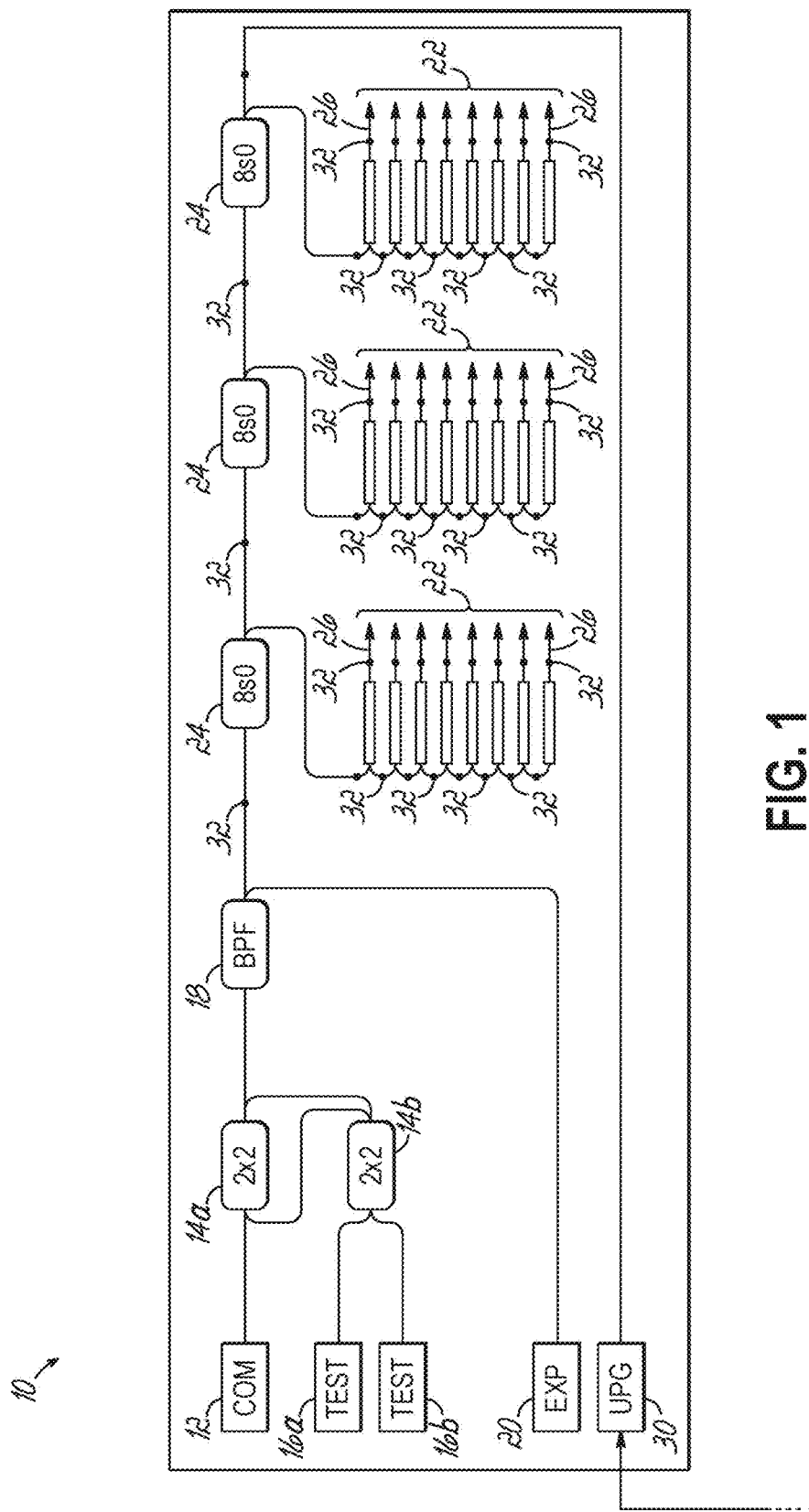
FIG. 1 is a schematic depiction of a twenty-four (24) channel DWDM fiber optic module known in the prior art.
Figure 3:
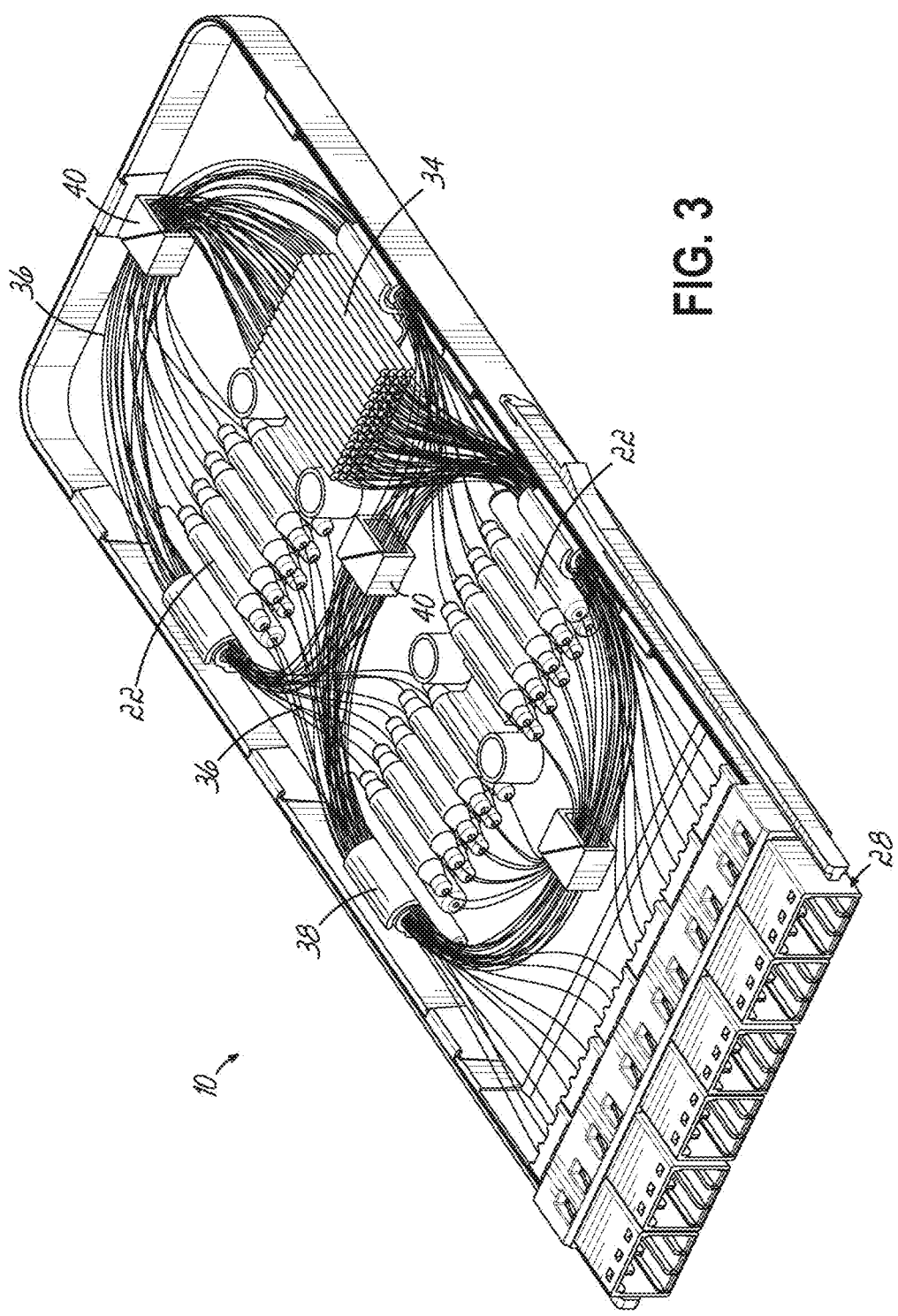
FIG. 3 is a perspective view of the twenty-four (24) channel DWDM fiber optic module of FIG. 1.

Various embodiments will be further clarified by examples in the description below. In general, the description relates to wavelength division multiplexing (WDM) devices that integrate a plurality of channel filters within the a body of a fiber optic connector. As used herein, the "body" of a fiber optic connector ("connector body") refers to the outer component or collection of outer components that support the ferrule(s) of the fiber optic connector and that include a coupling mechanism so that the fiber optic connector is configured to mechanically couple to another device (e.g., a corresponding adapter). Also, as used herein, "integrated" or "integrated together" broadly means that two optical components reside within the same device body, and more particularly means that one or more channel filters reside within the connector body. Each channel filter may itself comprise multiple optical components. In the DWDM optical fiber module 10 described above, the channel filters 22, which include thin film filters having a filter chip and collimators, are provided in sealed packages that are separate and distinct from the connectors at the terminated ends of the output channel connectors 26, which in turn mate to ports at the rear of a bulkhead 28. More particularly, in conventional designs the connector bodies and the sealed packages of the channel filters 22 are connected via a length of optical fiber. Moreover, that length of optical fiber typically includes one or more fusion splices, as illustrated in FIG. 1, and has to be managed along with the other optical fibers 36 in the DWDM fiber optic module 10 (e.g., see FIG. 3). One aspect of the present disclosure is to eliminate certain features of the output channel connectors 26 by integrating a plurality of channel filters 22 and a connector into a self-contained, pre-manufactured assembly.

Integrating a plurality of the channel filters (e.g., two or more channel filters) with the connector body provides a number of benefits. From a manufacturing standpoint, such an integrated connector-WDM device reduces the number of parts for manufacturing a multi-channel WDM module. For example, the sealed package of the channel filters and the connector body may be provided in a single body and the length of the optical fiber extending between the channel filters and the connectors may be eliminated or significantly reduced. From an assembly standpoint, the fusion splices required to optically connect the channel filters to the connectors at the bulkhead may also be eliminated. This reduces the amount of labor and reduces the likelihood of operator error involved in the assembly of the WDM module. Moreover, integrating a plurality of channel filters and a connector together reduces the overall footprint of the WDM module, thereby providing a more efficient use of space within a terminal of a fiber optic network.

In addition to the above, integrating a plurality of channel filters and a connector together allows a WDM module to be assembled in a more "plug and play" manner. In prior WDM modules, the building blocks of the modules where the individual parts, e.g., channel filters, optical fiber, and connectors. The integrated connector-WDM device as described below combines multiple components into a single building block. In other words, the integrated connector-WDM devices represent self-contained, pre-manufactured optical components that can simply be plugged into the ports at the rear of the bulkhead as part of an assembly process for multi-channel WDM modules. Thus, WDM modules can be assembled more compactly, more easily (less labor intensive), and with less likelihood of operator error during the assembly process.

Figure 4:
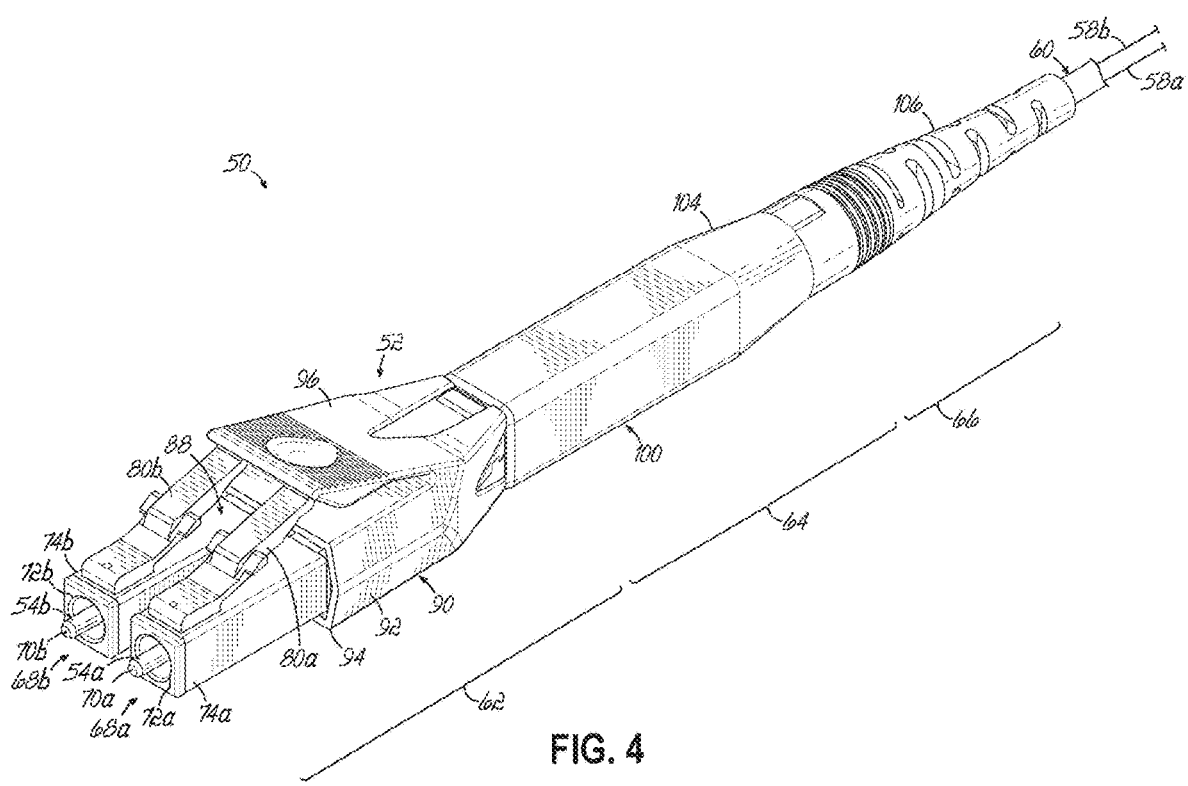
FIG. 4 is an integrated connector-WDM device in accordance with an embodiment of the disclosure.

FIG. 4 is a perspective view of an integrated connector-WDM device 50 in accordance with an embodiment of the disclosure. For convenience, the integrated connector-WDM device 50 will be referred to herein as a "connector-plexer," as the device provides the functionality of a fiber optic connector and a WDM multiplexer/demultiplexer in a self-contained, pre-manufactured unit. The connector-plexer 50 includes a connector body 52, at least one ferrule 54 associated with the body 52, a plurality of channel filters 56 (FIG. 5) in the body 52, and a plurality of optical fibers 58 extending from the connector body 52. The optical fibers 58 may be provided by a fiber optic cable 60 connected to the connector body 52. The connector body 52 includes a front portion 62 that provides an interface for connecting the connector-plexer 50 to another optical component, an intermediate portion 64 that represents an extension of the conventional connector body of the first portion 62 in order to accommodate the plurality of channel filters 56, and a rear portion 66 configured to be coupled to the fiber optic cable 60. Additionally, a boot 106 may be received over a region where the rear portion 60 couples to the fiber optic cable.

In an exemplary embodiment, the front portion 62 of the connector body 52 may be configured as a connector interface of known fiber optic connectors. For example, and as illustrated in FIG. 4, the front portion 62 of the connector body 52 may be configured as an LC duplex connector interface (e.g., according to IEC 61754-20-2:2012 or TIA/EIA 604-10-6:2008). In this regard, the front portion 62 of the connector body 52 may include two connector elements 68a, 68b, each connector element 68a, 68b being configured, for example, as an LC simplex connector. A description of connector element 68a will be provided with parts thereof having reference numerals with an "a" suffix. This description will also serve as a description of connector element 68b, but with the parts having reference numerals where the "a" suffix is replaced by a "b" suffix. The connector element 68a includes a ferrule 54a configured to support an optical fiber (not shown) extending in a generally longitudinal direction through a bore 70a of the ferrule 54a. An intermediate portion of the ferrule 54a extends through a front opening 72a of a connector housing 74a. The ferrule 54a extends from a ferrule holder (not shown) that is retained within the connector housing. A spring (not shown) biases the ferrule holder forward within the connector housing 74a so that a front end of the ferrule 54a projects forward beyond a front end of the connector housing 74a. The front end of the ferrule 54a presents the optical fiber extending through the bore 70a for optical coupling with a mating component (e.g., another fiber optic connector).

The connector element 68a further includes a latch arm 80a extending outwardly and rearwardly from (e.g., in a slanted direction relative to) a portion of the connector housing 74a. In this regard, the latch arm 80a has a proximal end coupled to the connector housing 74a and a distal end spaced from the connector housing 74a, with the connector housing 74a and the latch arm 80a being separated from one another and defining a space therebetween. An intermediate portion of the latch arm 80a includes cantilever latch tabs, which protrude laterally from the latch arm 80a. The distal end of the latch arm 80a may be depressed toward the connector housing 74a to disengage the connector element 68a from another structure, such as an adapter or a dust cap (neither shown in FIG. 4).

Still referring to FIG. 4, proximal portions of the connector elements 68a, 68b of the connector-plexer 50 are separated by a lateral gap 88. Rear portions of each connector element 68a, 68b reside within a shell 90, and more specifically, within a common connector housing (not shown) covered by the shell. The common connector housing 92 supports each connector element 68a, 68b. The shell 90 includes a front end 94 defining a generally rectangular opening that receives rear portions of the connector elements 68a, 68b. A trigger 96 extends outwardly and forwardly (e.g., in a slanted direction) relative to the shell 90 above a recess, with a front end of the trigger 96 extending over distal ends of the latch arms 80a, 80b of the connector elements 68a, 68b. In operation, a user may press the trigger 96 (e.g., at a finger receiving area) in a direction toward the shell 90 to cause the distal ends of the latch arms 80a, 80b to move toward the respective connector bodies 74a, 74b, thereby operating the latch arms 80a, 80b to permit disengagement of the connector elements 68a, 68b from another structure, such as an adapter or a dust cap.

As discussed in more detail below, while the front portion 62 of the connector body 52 has been described as a connector interface similar to an LC duplex connector, aspects of the disclosure are not so limited. In this regard, in alternative embodiments, the front portion 62 of the connector body 52 may be configured to have other types of connector interfaces, including but not limited to MDC, SN, or CS connectors (e.g., according to the QSFP-DD Multi-Source Agreement (MSA) Hardware Specification, Rev. 6.01, 2021, and the relevant documents cross-referenced therein), or other duplex or multi-fiber connector designs. Thus, the front portion 62 of the connector body 52 may take on a wide range of configurations and remain within the scope of the present disclosure.

In an exemplary embodiment, the intermediate portion 64 of the connector body 52 includes a tubular extension 100, which may be an extension of the common connector housing that supports the rear portions of the connector elements 68a, 68b within the shell 90. The tubular extension 100 includes an internal cavity 102 configured to receive a plurality of channel filters 56. In the embodiment illustrated in FIG. 4, the internal cavity 102 of the tubular extension 100 may be configured to hold two channel filters 56, but the number may vary depending on the application. Additional details and arrangement of the channel filters 56 will be provided below in reference to FIG. 5.

The rear portion 66 of the connector body 52 includes a narrowed region 104 in comparison to the tubular extension 100 of the intermediate region 64. Normally a crimp ring or band (now shown), a heat shrink tube (also not shown), and elastomeric boot 106 are provided with the connector-plexer 50. The crimp ring is typically a metal component that is crimped (i.e., deformed) onto a back-end portion of the connector body 52 to secure the cable 60 to the connector-plexer 50. Specifically, the cable 60 may include strength elements in the form of aramid yarns or fibers, and these aramid fibers may be extended over the rear portion 66 of the connector body 52. Placing the crimp ring over this cable-connector interface and performing the crimping secures the aramid fibers to the connector body 52. The heat shrink tube is then used to cover the interface between the crimp ring and the portion of the cable 60 from which the aramid fibers extend. Finally, the boot 106 is used to cover portions of both the connector body 52 and cable 60 to help limit bending at the cable-connector interface. It should be recognized that in an alternative embodiment, the features of the cable 60 may be omitted and the optical fibers 58 may extend from the connector body 52 without cable features.

FIG. 5 schematically illustrates the connectorplexer 50 inserted into an adapter and mated with another connector-plexer (not labeled; phantom lines). FIG. 5 also schematically illustrates the arrangement of a plurality of channel filters 56 within the connector body 52 of the connector-plexer 50. As noted above, in an exemplary embodiment, two channel filters 56a, 56b may be provided with the connector-plexer 50. A description of channel filter 56a will be provided with parts therefor having reference numerals with an "a" suffix. This description will also serve as a description of channel filter 58b, but with the parts having reference numerals where the "a" suffix is replaced by a "b" suffix. The channel filter 56a may be configured as a three-port thin film filter (TFF) and include a first collimator 116a generally aligned with but separated from a second collimator 118a by a space or gap 120a that defines an optical path between the first collimator 116a and the second collimator 118a. A thin film filter chip 122a may be disposed in the optical path between the two collimators 116a, 118a. The collimators 116a, 118a are configured to focus an optical beam received by the collimators and provide uniform directionality of the optical beam. FIGS. 6-8B illustrate exemplary collimators that may be used as channel filter 56a, 56b in embodiments of the disclosure. For example, FIG. 6 illustrates an exemplary tube collimator 124 that includes a tube body 126 with a curved lens 128 at one end of the tube body 126. An optical fiber 130 is extends from an opposite end of the tube body 126. The optical fiber 130 is supported within tube body 126 and optically aligned with the curved lens 128.

Figure 7A:
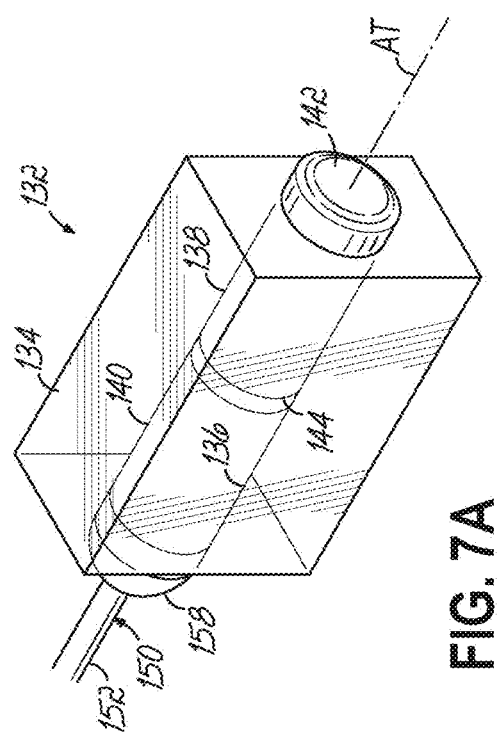
FIGS. 7A and 7B are views of another collimator in accordance with another embodiment of the disclosure.
Figure 7B:
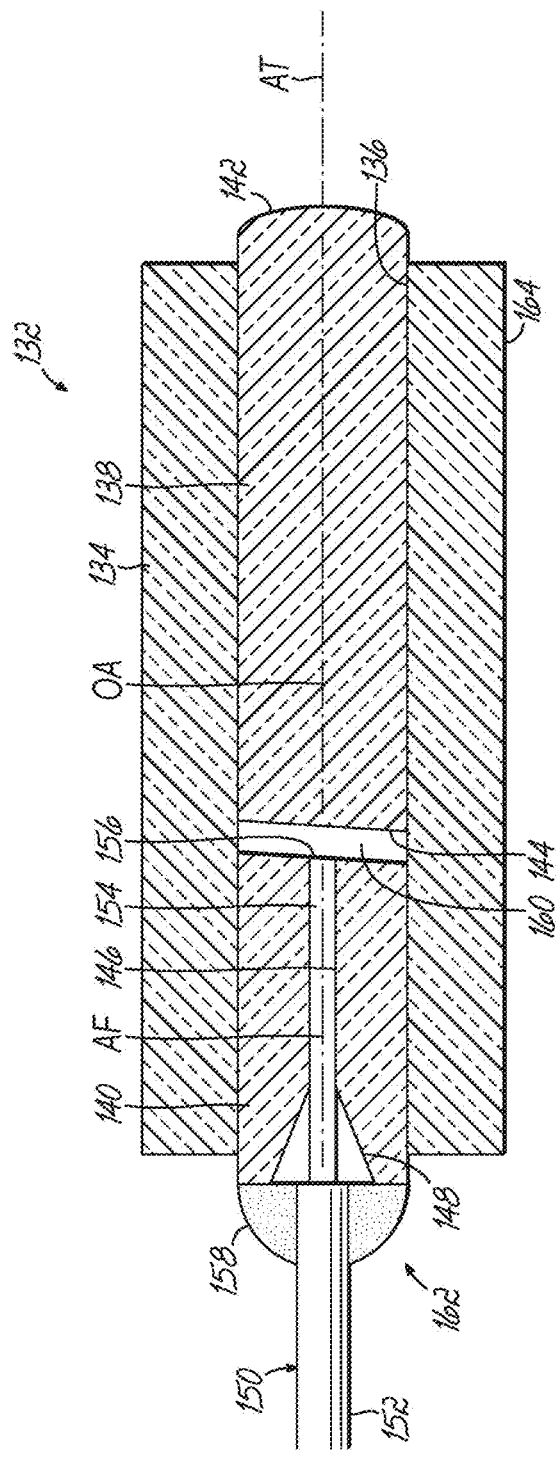

FIGS. 7A and 7B illustrate another exemplary collimator 132 that includes a cylindrical, glass tube 134 with a central bore 136. The term "cylindrical" is used in this disclosure in its most general sense and may be defined as a three-dimensional object formed by taking a two-dimensional (2D) shape and projecting it in a direction perpendicular to the associated 2D plane. Thus, a cylinder, as the term is used in this disclosure, is not limited to having a circular cross-section shape but may have any cross-sectional shape, such as the square cross-sectional shape shown in FIGS. 7A and 7B.

The collimator 132 further includes optical elements, such as a collimating lens 138, a ferrule 140, etc., that may be secured to the glass tube 134 using adhesive or other means. The collimating lens 138 has a front surface 142 and a back surface 144 opposite the front surface 142. In the example shown, the front surface 142 is convex while the back surface 144 is angled, e.g., in a plane perpendicular to an optical axis OA. In one embodiment, the front surface 142 of collimating lens 138 may reside outside of the central bore 136, i.e., the front-end portion of the collimating lens 138 may extend slightly past the front end of the glass tube 134. In an alternative embodiment not shown, the collimating lens 138 may be formed as a gradient-index (GRIN) element that has a planar front surface. The collimating lens 138 may consist of a single lens element or of multiple lens elements. In the discussion below, the collimating lens 138 is shown as a single lens element for ease of illustration and discussion.

The ferrule 140 includes a central bore 146 that runs between a front end and a back end along a ferrule central axis AF, which may be co-axial with a tube central axis AT of the glass tube 134 and the optical axis OA defined by the collimating lens 138. The central bore 146 may include a flared portion 148 at the back end of the ferrule 140. An optical fiber 150 has a coated portion 152 and an end portion 154, the latter being bare glass (e.g., is stripped of coating) and is thus referred to as the "bare glass portion 154." The bare glass portion 154 includes a polished end face 156 that defines a proximal end of the optical fiber 150. The bare glass portion 154 extends into the central bore 146 of the ferrule 140 at the back end of the ferrule 140. Adhesive 158 may be disposed around the optical fiber 150 at the back end of the ferrule 140 and/or within the central bore 146 to secure the optical fiber 150 to the ferrule 140. The front end of the ferrule 140 is angled in a plane perpendicular to the ferrule central axis AF and is axially spaced apart from the angled back end of the collimating lens 138 to define a gap 160 that has a corresponding axial gap distance. While the optical fiber 150 is described above as being glass, other types of optical fibers may be used, such as, for example, a plastic optical fiber.

The ferrule 140 and optical fiber 150 constitute a fiber pigtail 162, which can be said to reside at least partially within the central bore 146 adjacent the back end of the glass tube 134. Thus, in one embodiment, the collimator 132 includes only the glass tube 134, the collimating lens 138, and the fiber pigtail 162. The glass tube 134 serves in one capacity as a small lens barrel that supports and protects the collimating lens 138 and the fiber pigtail 162, particularly the bare glass portion 154 and its polished end face 156. The glass tube 134 also serves in another capacity as a mounting member that allows for the collimator 132 to be mounted to a support substrate. In this capacity, at least one flat surface 164 serves as a precision mounting surface.

The glass tube 134, the collimating lens 138, and the ferrule 140 may all be made of a glass material, and in some embodiments, are all made of the same glass material. Making the glass tube 134, the collimating lens 138, and the ferrule 140 out of a glass material has the benefit that these components will have very close if not identical coefficients of thermal expansion (CTE). This feature is particularly advantageous in environments that can experience large swings in temperature.

The optical elements used in the collimator 132 are sized to be slightly smaller than the diameter of the central bore 146 (e.g., by a few microns or tens of microns) so that the optical elements may be inserted into the central bore 146 and moved a select location. The optical elements and the support/positioning elements may be inserted into and moved within the central bore 146 to their select locations using micro-positioning devices. The optical elements and the support/positioning elements may be secured within the central bore 146 using a number of securing techniques, such as securing with an adhesive (e.g., a curable epoxy), glass soldering, glass welding, or some combination of these techniques.

Figure 8A:
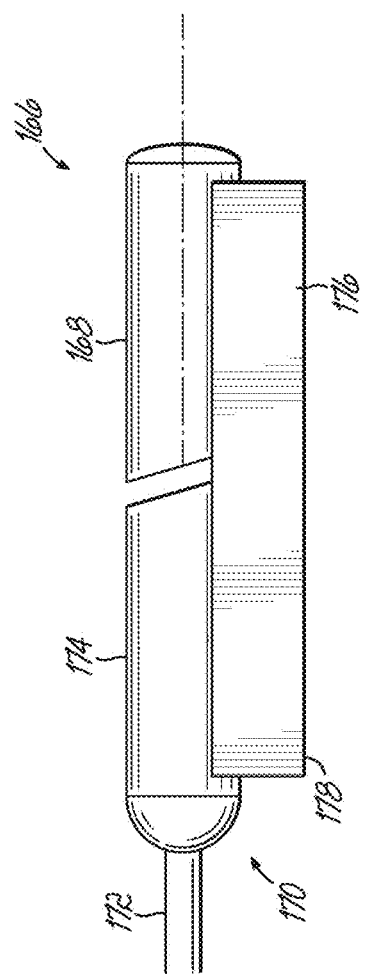
FIGS. 8A and 8B are views of another collimator in accordance with another embodiment of the disclosure.
Figure 8B:
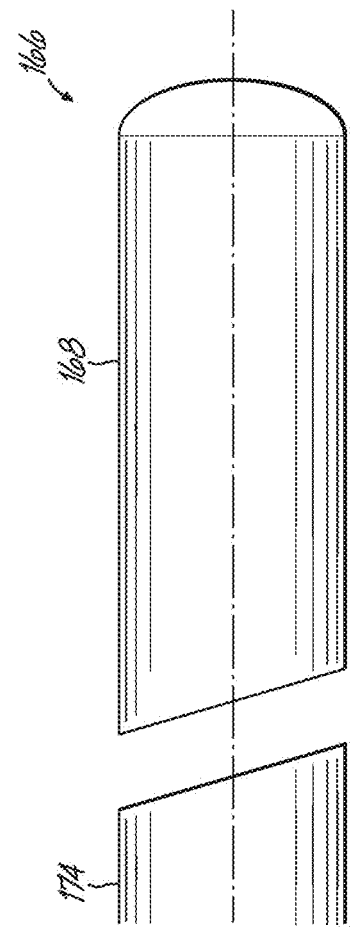

FIG. 8A is a perspective view of another exemplary collimator 166 for use with the channel filter 56a. The collimator 166 includes a lens 168 (e.g., a glass or silica collimating lens), a fiber pigtail 170 (e.g., an optical fiber 172 terminated by a ferrule 174), and a base 176 that defines a groove (e.g., a generally v-shaped groove). The lens 168 and the fiber pigtail 170 are disposed in the groove and supported by the base 176. The lens 168 is configured to receive an optical beam and the fiber pigtail 172 is optically coupled to the lens 168 and configured to provide the optical beam to the lens 168 and/or to receive the optical beam from the lens As schematically illustrated in FIG. 8B, there may be a gap/space between the lens 168 and the ferrule 174 of the fiber pigtail 172. The lens 168 and the ferrule 174 may be secured to the base 176 (FIG. 8A) independent of each other to allow for precise adjustment of the gap size to achieve desirable optical properties (e.g., low attenuation of the optical signal passing through the collimator 166). The base 176 of the collimator 166 has a generally flat bottom surface 178 for mounting on a substrate. In some embodiments, the base 176 has a width that is less than a width of the lens 168 and a width of the ferrule 174.

Figure 9:
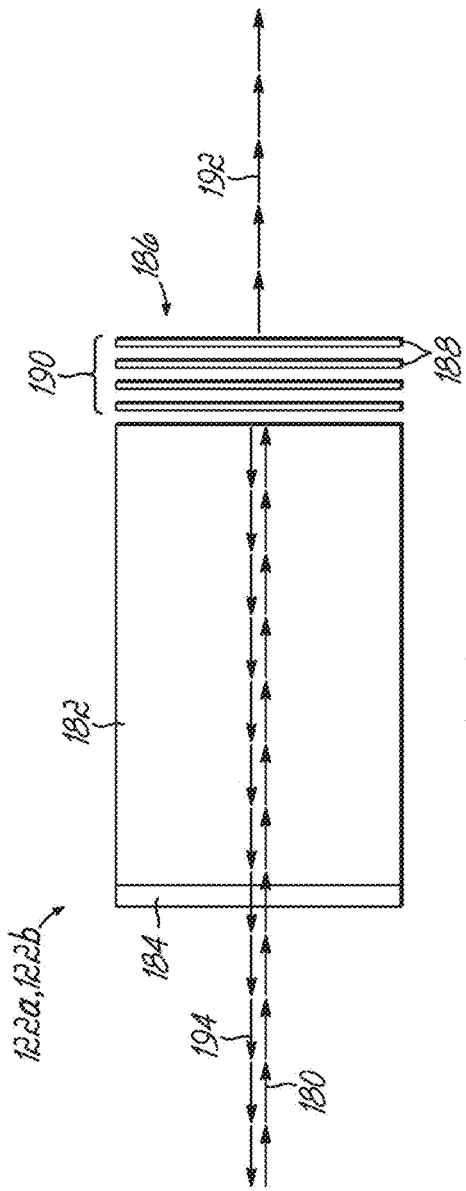
FIG. 9 is a schematic illustration of a filter chip in accordance with an embodiment of the disclosure.

With further reference to channel filter 56a, FIG. 9 schematically illustrates a typical construction of a filter chip 122a configured to receive an input optical beam 180 carrying a plurality of optical signals, each optical signal having a different wavelength. The filter chip 122a includes an optically transparent substrate 182, an anti-reflective coating 184 applied to one side of the substrate 182, and a filter coating 186 applied to the opposite side of the substrate 182. The filter coating 186 may include a plurality of thin layers 188 of dielectric material (exaggerated for purpose of discussion), typically referred to as a layer stack 190. Each layer 188 in the layer stack 190 has a thicknesses and refractive index selected so that the filter coating 186 transmits an optical beam 192 carrying a selected optical signal associated with a desired wavelength in the passband of the filter chip 122a, and reflects an optical beam 194 carrying the remaining optical signals associated with wavelengths outside the passband of the filter chip 122a. Thus, the optical performance of the filter chip 122a is determined, at least in part, by the design of the layer stack 190. Generally, layer stack 190 includes up to several dozen layers 188 of alternating materials with different refractive indexes. The optical characteristics are determined by the interplay of the refractive index difference and the thicknesses of the layers 188. Those of ordinary skill in the art understand how to configure the layer stack 190 to transmit a selected wavelength while reflecting all other wavelengths. Accordingly, a further discussion of the arrangement of the layer stack 190 and the construction of the filter chip 122a will be omitted for sake of brevity.

With reference back to FIG. 5, the channel filter 56a is associated with three optical fibers: i) an input optical fiber 200a that carries an optical beam with a plurality of optical signals each at different wavelengths; ii) a filtered optical fiber 202a that carries an optical beam with a selected optical signal (i.e., the desired wavelength) from the plurality of optical signals; and iii) a reflected optical fiber 204a that carries an optical beam with the remaining optical signals of the plurality of optical signals. The input optical fiber 200a and the reflected optical fiber 204a each have one end connected to the second collimator 118a. The filtered optical fiber 202a has one end connected to the first collimator 116a and a second end connected to the ferrule 54a of the connector-plexer 50. In one embodiment, the first collimator 116a, the ferrule 54a, and the filtered optical fiber 202a may be pre-manufactured and incorporated into the connector-plexer 50 as a self-contained unit. In any event, the optical connection between the first collimator 116a and the ferrule 54a may be made without a fusion splice, which is in contrast to current WDM modules as described above. Moreover, the length of the filtered optical fiber 202a is relatively short, obviating the need for excess space that provides fiber management purposes.

Figure 2:
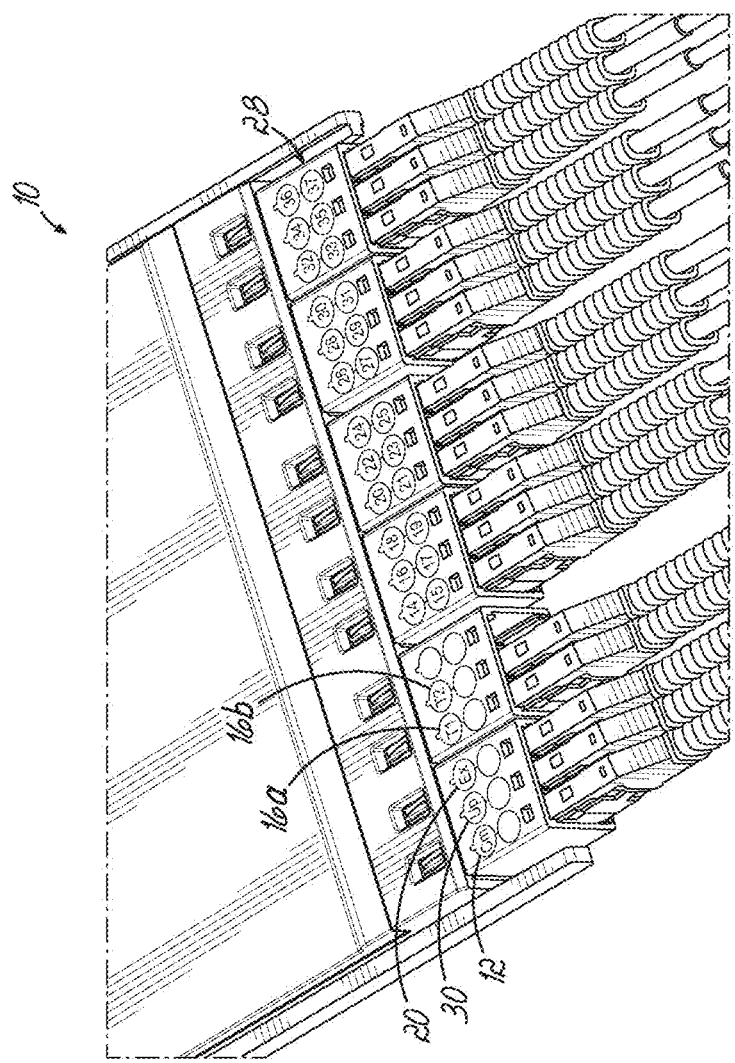
FIG. 2 illustrates a fiber optic connection arrangement for the twenty-four (24) channel DWDM fiber optic module of FIG. 1.

As noted above, the connector-plexer 50 includes a plurality of channel filters 56. In an exemplary embodiment, the channel filters 56a, 56b are arranged in a concatenated sequence, wherein the reflected optical beam from the first channel filter 56a is transmitted as the input optical beam to the second channel filter 56b, where another optical signal is filtered from the input optical beam. In the embodiment of FIG. 5, this is accomplished using a jumper optical fiber 206 which has a first end connected to the first channel filter 56a and a second end connected to the second channel filter 56b. As illustrated in this figure, a portion of the jumper optical fiber 206 operates as the reflected optical fiber 204a from the first channel filter 56a and another portion of the jumper optical fiber 206 operates as the input optical fiber 200b of the second channel filter 56b. In such an embodiment, because of the self-contained, pre-manufactured nature of the connector-plexer 50, the optical connection between the channel filters 56a, 56b may be made without a fusion splice, i.e., the jumper optical fiber 206 is devoid of a splice. Again, this is in contrast to current WDM modules (e.g., see FIGS. 1-3), where the optical connection between adjacent channel filters includes one or more splices.

As illustrated in FIG. 5, the jumper optical fiber 206 is provided with some excess length to prevent excessive bends in the optical fiber 206 and to allow possible rework situations, and thus requires some level of fiber management. For example, in one embodiment the connector-plexer 50 may include a fiber reel 208 positioned near the rear of the connector body 52 for winding excess amounts of the jumper optical fiber 206 thereabout. The connector-plexer 50 may also include other fiber management elements similar to those described above. While the fiber management scheme does require additional space in the connector-plexer 50, the amount of additional space is much less than that required for concatenating channel filters in current WDM modules. Thus, the connector-plexer 50 has a reduced footprint compared to current WDM devices.

With the various elements described above, operation of the connector-plexer 50 will now be provided. The fiber optic cable 60 connected to the connector-plexer 50 carries at least two optical fibers 58a, 58b. The first optical fiber 58a operates as an input to the connector-plexer 50 and carries a first optical beam. The first optical fiber 58a may be referred to as the input optical fiber and the first optical beam may be referred to as the input optical beam. The second optical fiber 58b operates as an output to the connector-plexer 50 and may carry a second optical beam. The second optical fiber 58b may be referred to as the output optical fiber and the second optical beam may be referred to as the output optical beam. Broadly speaking, in operation some of the optical signals carried by the input optical beam in the input optical fiber 58a are "filtered out" and the remaining optical signals transmitted as the output optical beam in the output optical fiber 58b. More particularly, in operation the input optical beam in the input optical fiber 58a is provided to the first channel filter 56a (e.g., as the input optical fiber 200a). That input optical beam travels through the second collimator 118a and to the filter chip 122a, where a first optical signal is filtered from the optical beam and provided to the first collimator 116a. The optical beam carrying the first optical signal travels through the first collimator 116a and into the first end of the filtered optical fiber 202a, from where the optical beam travels to ferrule 54a of the connector-plexer 50.

The remaining optical signals of the input optical beam are reflected from the filter chip 122a of the first channel filter 56a and travel back through the second collimator 118a and are received in the first end of the jumper optical fiber 206, a portion of which operates as the reflected optical fiber 204a in this embodiment. That reflected optical beam travels through the jumper optical fiber 206 to the second collimator 118b of the second channel filter 56b, since another portion of the jumper optical fiber 206 in this embodiment operates as the input optical fiber 200b. That reflected optical beam travels through the second collimator 118b and to the filter chip 122b of the second channel filter 56b, where a second optical signal is filtered from the optical beam and provided to the first collimator 116b of the second channel filter 56b. The optical beam carrying the second optical signal travels through the first collimator 116b and into the first end of the filtered optical fiber 202b of the second channel filter 56b, from where the optical beam travels to ferrule 54b of the connector-plexer 50. The remaining optical signals of the reflected optical beam (should there be any) are reflected from the filter chip 122b of the second channel filter 56b, travel through the second collimator 118b and are received in an end of the output optical fiber 58b as the output optical beam (the output optical fiber 58b operates as the reflected optical fiber 204b in this embodiment). As discussed in more detail below, the output optical beam may be transmitted to the input side of another connector-plexer to filter out additional optical signals carried by the optical beam.

Figure 10:
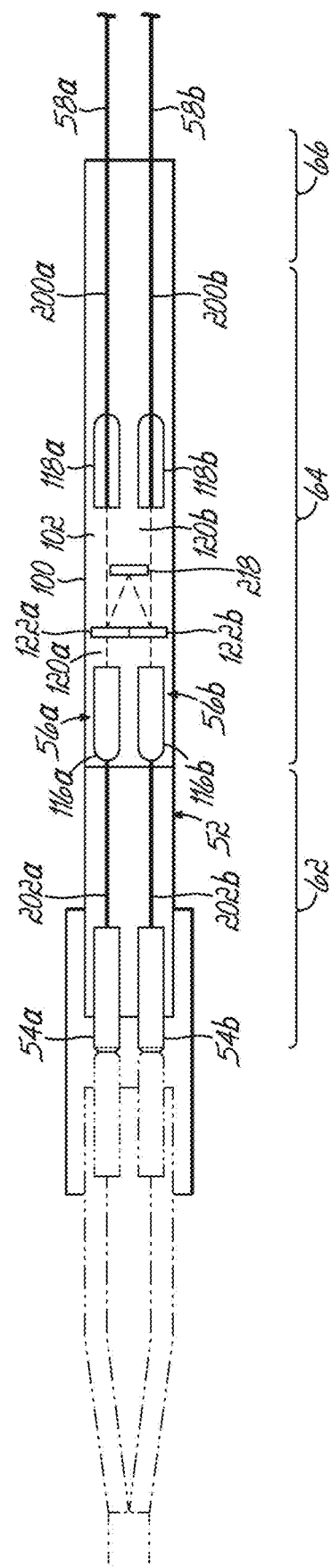
FIG. 10 is a schematic cross-sectional view of an integrated connector-WDM device plugged into a bulkhead of a fiber optic module in accordance with another embodiment of the disclosure.

FIG. 10 illustrates a connector-plexer 216 in accordance with an alternative embodiment of the disclosure that eliminates additional parts in its assembly and may provide a more compact design. Connector-plexer 216 is similar in many respects to connector-plexer 50, and like elements are labeled with like reference numbers for simplicity. The primary difference between connector-plexers 50, 216 is directed to the optical connection between adjacent channel filters 56. In the embodiment shown in FIG. 5, a jumper optical fiber 206 provides the optical connection between adjacent channel filters 56a, 56b. For connector-plexer 216, however, the jumper optical fiber 206 is omitted and "free space" techniques are employed to transmit the reflected optical beam from the filter chip 122a of the first channel filter 56a to the filter chip 122b of the second channel filter 56b.

To achieve the free space optical connection between adjacent channel filters 56, the connector-plexer 216 includes a reflective optical element 218, such as a reflective lens, prism, or other reflective device (referred to as "optical reflector"), disposed between adjacent channel filters 56. Such optical reflectors 218 are known in the art and a detailed discussion of such elements will be omitted for brevity. In operation, and with reference to FIG. 10, the input optical beam in the input optical fiber 58a is provided to the first channel filter 56a (as the input optical fiber 200a). That input optical beam travels through the second collimator 118a and to the filter chip 122a, where a first optical signal is filtered from the optical beam and provided to the first collimator 116a. The optical beam carrying the first optical signal travels through the first collimator 116a and into the first end of the filtered optical fiber 202a, from where the optical beam travels to the ferrule 54a of the connector-plexer 216.

The remaining optical signals of the input optical beam are reflected from the filter chip 122a toward the optical reflector 218. The optical beam is reflected from the optical reflector 218 toward the filter chip 122*b* of the next channel filter 56*b*, where a second optical signal is filtered from the optical beam and provided to the first collimator 116*b* of the second channel filter 56*b*. The optical beam carrying the second optical signal travels through the first collimator 116*b* and into the first end of the filtered optical fiber 202*b* of the second channel filter 56*b*,from where the optical beam travels to the ferrule 54*b* of the connector-plexer 216. The remaining optical signals of the reflected optical beam (should there be any) are reflected from the chip 122*b* of the second channel filter 56*b*,travel through the second collimator 118*b* of the second channel filter 56*b*,and are received in an end of the output optical fiber 58*b* as the output optical beam. Thus, in the embodiment shown in FIG. 10, the jumper optical fiber 206 may be omitted and the fiber management scheme, including the fiber reel 208, may also be omitted. Accordingly, this results in an integrated connector-WDM device with smaller parts that may result in an even more compact device. Moreover, in embodiments having more than two channel filters 56, the second collimators 118 may also be omitted for those filters not directly connected to the input and output optical fibers 58*a*, 58*b*.

Figure 11:
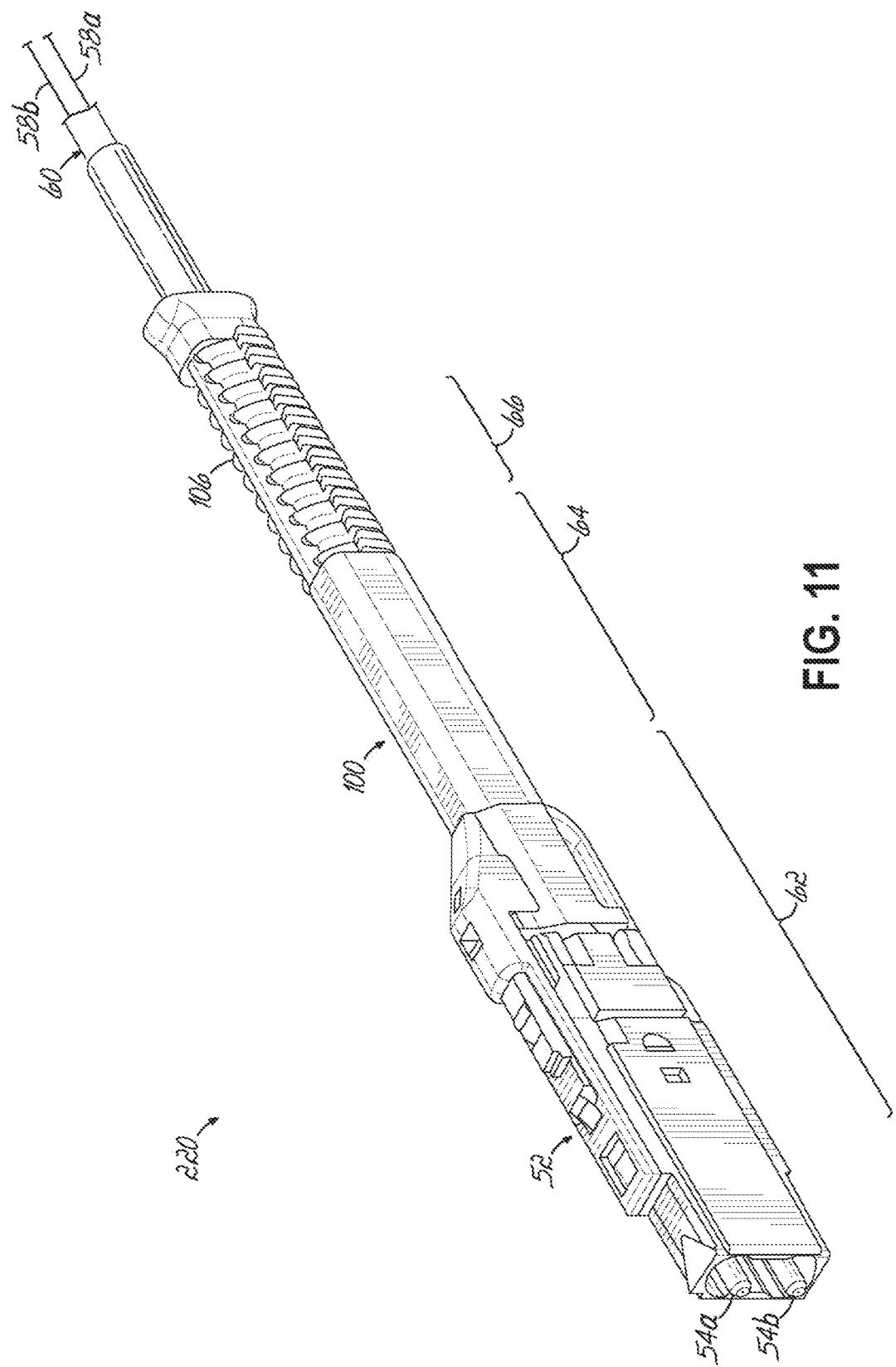
FIG. 11 is an integrated connector-WDM device in accordance with another embodiment of the disclosure.

While the connector-plexers 50, 216 described above provide a connector interface configured as an LC duplex connector, as noted above, such embodiments are merely exemplary and it should be understood that a connector-plexer according to the present disclosure may be configured to have other types of connector interfaces. By way of example, FIG. 11 illustrates a connector-plexer 220 where the connector interface is configured as an MDC duplex connector. Thus, the connector interface of the connector-plexer should not be limited to those shown and described herein as the connector interface may take on a wide range of configurations. Moreover, while each optical signal filtered by respective channel filters were directed to dedicated ferrules in the connector-plexer (e.g., see FIGS. 5 and 10), aspects of the disclosure should not be limited to such an arrangement. For example, the one or more ferrules of the connector-plexer may be multi-fiber ferrules where a plurality of optical fibers are connected to a single ferrule. Furthermore, while the connector-plexers described above include two channel filters 56 in the connector body, this is merely exemplary and is due to many of the connector interfaces having a duplex arrangement (i.e., two ferrules). It should be recognized, however, that in alternative embodiments, connector-plexers may include more than two channel filters and more than two ferrules. By way of example, connector-plexers having four (4), six (6), eight (8) or twelve (12) channel filters and corresponding ferrules (or a corresponding multi-fiber ferrule) at the connector interfaces remain within the scope of the present disclosure.

Figure 13:
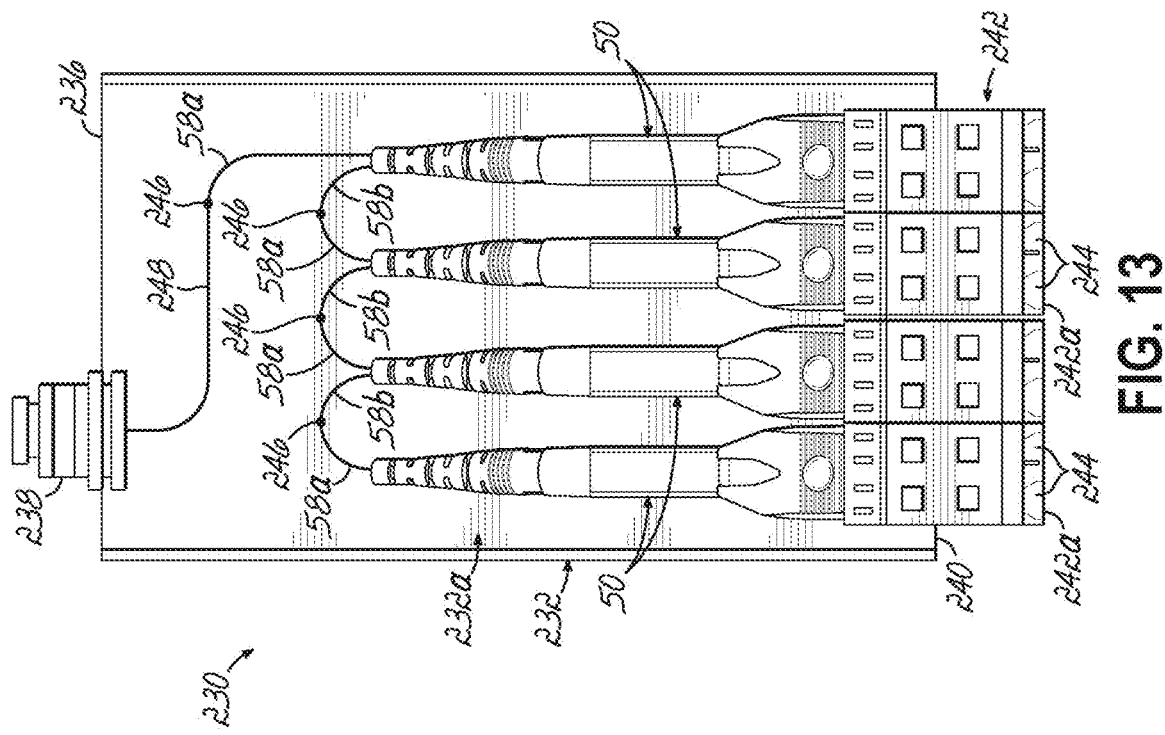
FIG. 13 is a top plan view of the DWDM fiber optic submodule shown in FIG. 12 showing the integrated connector-WDM devices positioned therein.
Figure 12:
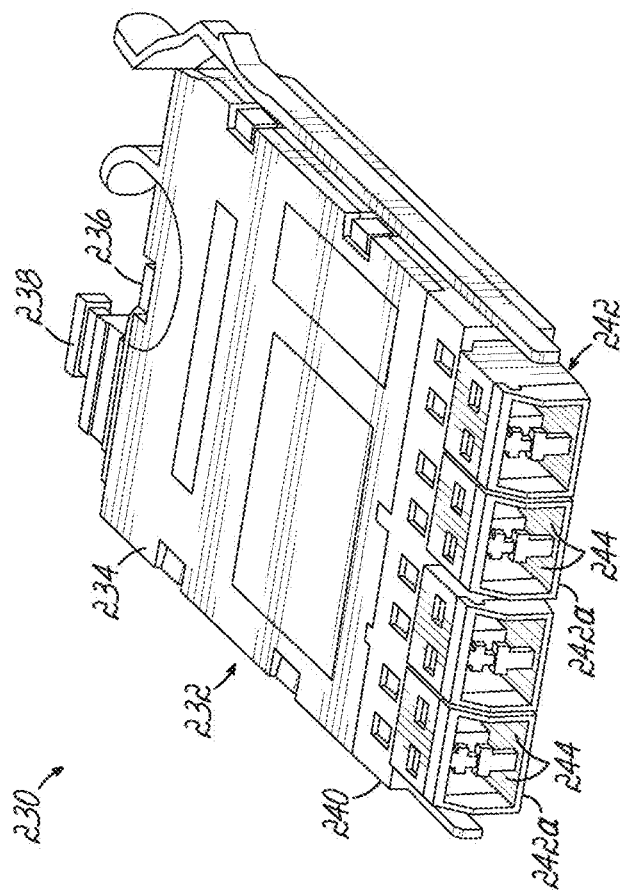
FIG. 12 illustrates a perspective view of an eight (8) channel DWDM fiber optic submodule in accordance with an embodiment of the disclosure.

In another aspect of the present disclosure, the connector-plexers described above allow WDM modules to be more easily assembled by providing larger, more inclusive "building blocks" for constructing the WDM modules. In other words, instead of the WDM modules being assembled from many different individual parts through, for example, many fusion splices, WDM modules may be assembled using WDM "submodules" that are themselves formed from the self-contained, pre-manufactured connector-plexers described above. By way of example, FIG. 12 illustrates a WDM submodule 230 in accordance with an embodiment of the disclosure. The WDM submodule 230 includes a generally rectangular main body 232 having a removable cover 234 for accessing an interior 232*a* of the WDM submodule 230 (FIG. 13). A rear portion 236 of the main body 232 may include a fiber optic component 238, such as a fiber optic adapter, that operates as an input port for receiving a fiber optic connector that carries an input optical beam to the WDM submodule 230. A front portion 240 of the main body 232 includes a bulkhead 242 having one or more adapters 242*a* defining a plurality of channel ports 244 at a front portion thereof and configured to receive a one or more connectors (e.g., a duplex connector) for accessing the optical signals carried by the optical beam received in the fiber optic component 238. In the illustrated embodiment, the bulkhead 242 includes four (4) adapters 242*a* with a total of eight (8) channel ports 244 (for eight (8) optical signals) being provided. It should be understood, however, that the WDM submodule 230 may include other numbers of adapters 242*a* and channel ports 244 depending on the particular application.

As illustrated in FIG. 13, the WDM submodule 230 (with the cover 234 removed for clarity) includes a plurality of connector-plexers 50 coupled to respective ports in the rear of the one or more adapters 242*a* of the bulkhead 242. By way of example, each adapter 242*a* may be configured to receive one connector-plexer 50, but the number may vary depending on the particular application. Thus, the WDM submodule 230 is configured to receive four (4) connector-plexers 50, each being as shown and described above. The plurality of connector-plexers 50 may be concatenated by optically connecting the output optical fiber 58*b* from one connector-plexer to the input optical fiber 58*a* of the next connector-plexer. This may be achieved, for example, by a fusion splice, which is schematically illustrated by nodes 246 in FIG. 13.

In operation, the input optical fiber 58*a* of one of the connector-plexers 50 is connected to a pigtail 248 at a fusion splice 246, and the pigtail is terminated by a fiber optic connector received in the rear of the fiber optic component 238 accessible from inside the WDM submodule 230. The input optical beam carries a plurality of optical signals and is transmitted to the first connector-plexer 50 in the WDM submodule 230. Two optical signals are filtered from the optical beam and transmitted to the ferrules 54 of the first connector-plexer 50, which are received in respective ports at the rear of the one or more adapters 242*a* as illustrated in FIG. 13 (e.g., the rightmost connector-plexer 50). The optical beam traveling in the output optical fiber 58*b* in the first connector-plexer 50 still includes a plurality of optical signals and is transmitted to the input optical fiber 58*a* of the next connector-plexer 50, where two more optical signals are filtered out and provided to ferrules 54 received in respective ports at the rear of the one or more adapters 242*a*. The optical beam continues to pass through the remaining connector-plexers 50 so that all eight optical signals have been filtered from the input optical beam and directed to respective ports at the rear of the one or more adapters 242*a* by the connector-plexers 50. The optical signals of the WDM submodule 230 may be accessed by connecting a fiber optic cable (with a suitable fiber optic connector; neither shown) with the channel ports 244 at the front of the one or more adapters 242*a* of the bulkhead 242 (e.g., similar to that shown in FIG. 2).

Figure 14:
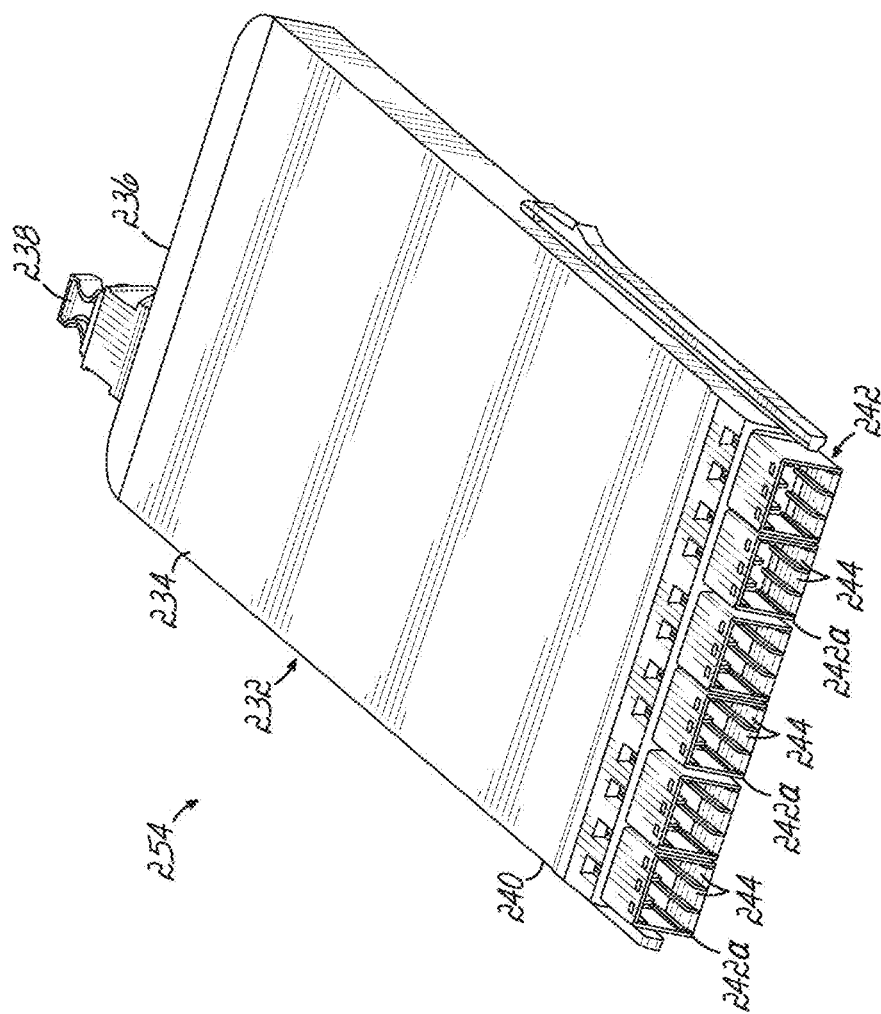
FIG. 14 illustrates a perspective view of another fiber optic submodule in accordance with an embodiment of the disclosure.

FIG. 14 illustrates an alternative embodiment of a WDM submodule 254 configured to receive connector-plexers 216 instead of connector-plexers 50. The WDM submodule 254 is similar to WDM submodule 230 and like features have been provided with like reference numbers. The primary difference is that the bulkhead 242 includes one or more adapters 242*a* that are configured to receive MDC-type connector interfaces instead of LC-type connector interfaces. Otherwise, the configuration and operation of the WDM submodule 254 is substantially the same as that described above and a further description will not be provided.

Figure 15:
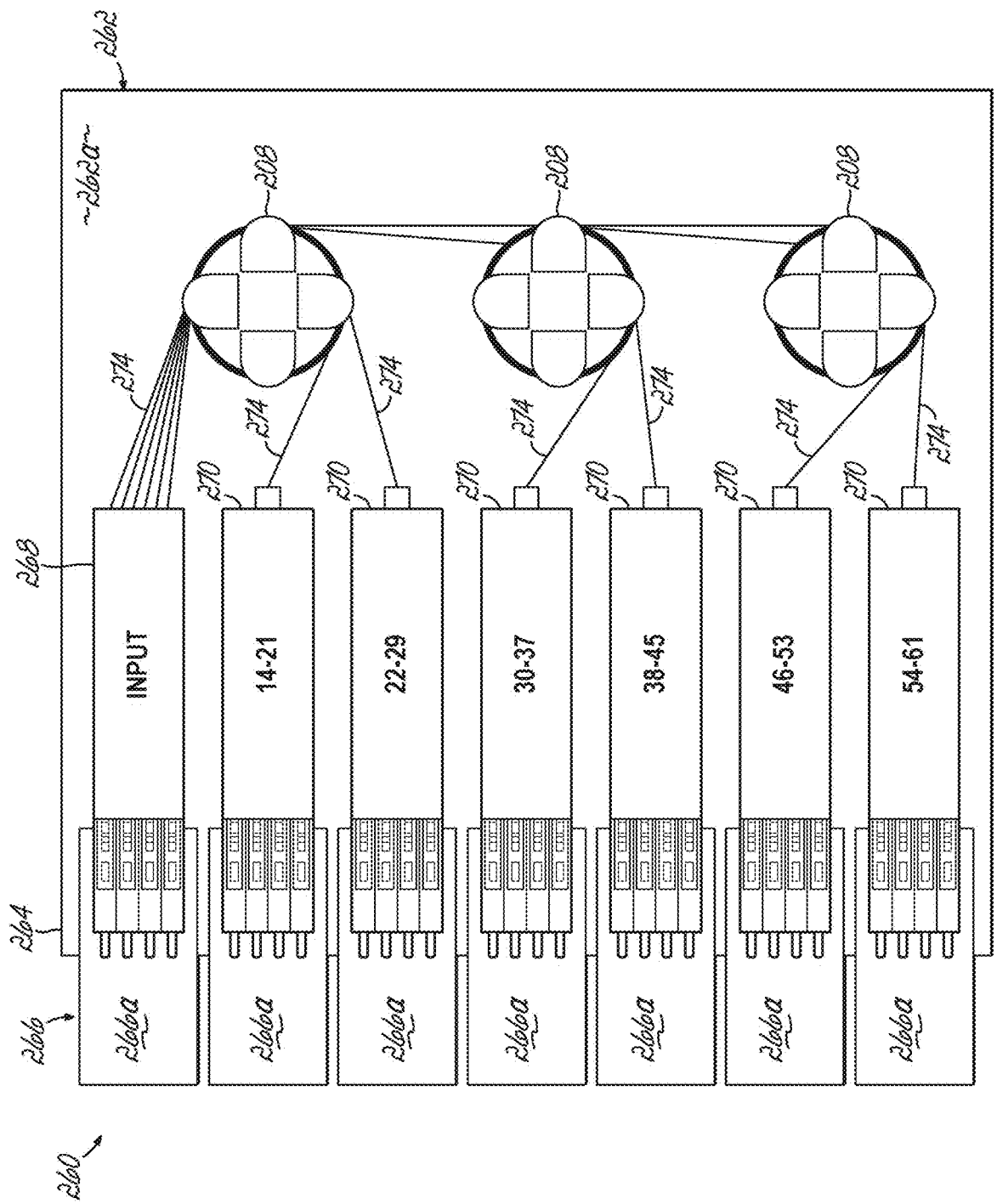
FIG. 15 is a schematic illustration of a WDM fiber optic module formed from multiple fiber optic submodules.
Figure 16:
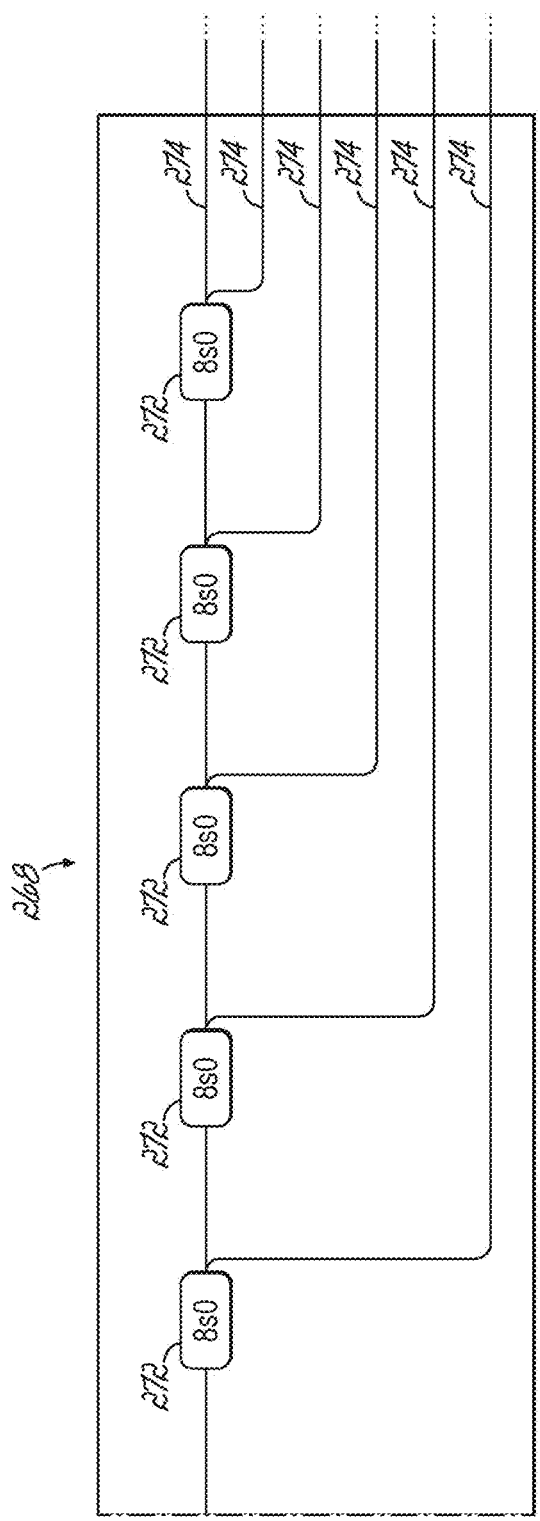
FIG. 16 is a partial schematic illustration of the input fiber optic submodule shown in FIG. 15.

FIG. 15 is a schematic illustration of a forty-eight (48) channel WDM module 260 in accordance with an embodiment of the disclosure. The WDM module 260 includes a generally rectangular main body 262 that defines an interior 262a and further includes a front portion 264 that defines a bulkhead 266 defined by one or more adapters 266a. The WDM module 260 includes a plurality of submodules associated with the one or more adapters 266a of the bulkhead 266. More particularly, the plurality of submodules includes at least one input submodule 268 and a plurality of WDM submodules 270, which in various embodiments may take the form of WDM submodules 230 or WDM submodule 254 described above. An exemplary input submodule 268 is illustrated in FIG. 16 and, although not shown, may include a common port for receiving an input optical beam, various test ports, an express port, an upgrade port and the associated components for achieving such signals at these ports. More pertinent to this disclosure, however, the input submodule 268 may include a plurality of group bandpass filters 272, such as that provided by eight-skip-zero (8s0) filters. For the forty-eight (48) channel WDM module 260 illustrated, the input submodule 268 may include five (5) group bandpass filters 272. The output optical fibers 274 from each of the group bandpass filters 272 which each carry, for example, eight (8) optical signals, extend from a rear of the input submodule 268. Referring back to FIG. 15, each of the output optical fibers 274 may be routed to a respective one of the WDM submodules 270 and connected to the fiber optic component 238 associated with each WDM submodule 270.

The WDM module 260 may include fiber management elements, such as a plurality of fiber reels 208, near the rear of the module body 262 for winding excess length of the optical fibers 274 and preventing excess bending of the fiber. Once the optical fibers 274 are connected to the fiber optic components 238 of each of the WDM submodules 270, the optical beam carrying the eight (8) optical signals are divided in the manner described above for the WDM submodules 230, 254. Thus, by increasing the "building blocks" of WDM modules, the assembly of such modules is simplified, becoming more of a plug-and-play arrangement. This, in turn, allows a wide range of WDM modules to be assembled in a straight-forward manner with less labor and higher reliability.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A wavelength division multiplexing (WDM) module, comprising:
 a module body defining an interior;
 a bulkhead at a front portion of the module body, the bulkhead including one or more adapters defining a plurality of rear ports accessible from the interior of the module body and a plurality of front ports accessible from an exterior of the module body; and
 a plurality of integrated connector-WDM devices in the interior of the module body and connected to respective rear ports of the bulkhead, wherein each integrated connector-WDM device of the plurality of integrated connector-WDM devices comprises:
  a housing defining a housing interior and including a connector interface having at least one ferrule;
  a device input optical fiber extending from the housing and configured to carry an input optical beam having a plurality of optical signals each having a different wavelength;
  a device output optical fiber extending from the housing and configured to carry an output optical beam having a plurality of optical signals each having a different wavelength; and
  a plurality of channel filters positioned in the housing interior, wherein a first channel filter of the plurality of channel filters is connected to the device input optical fiber, wherein a second channel filter of the plurality of channel filters is connected to the device output optical fiber; and
 a plurality of submodules positioned in the interior of the module body and including at least one input submodule and a plurality of WDM submodules,
 wherein the at least one input submodule includes a plurality of group bandpass filters, each of the plurality of group bandpass filters having a bandpass output optical fiber configured to carry an optical beam having a plurality of optical signals each of a different wavelength,
 wherein each of the plurality of WDM submodules includes at least one of the integrated connector-WDM devices,
 wherein each of the bandpass output optical fibers is connected to a respective one of the plurality of WDM submodules; and
 wherein at least one of the plurality of channel filters is configured to separate at least one optical signal from the plurality of optical signals of the device input optical beam and provide the at least one optical signal to the at least one ferrule.

2. The WDM module of claim 1, wherein each of the plurality of WDM devices is connected to another of the plurality of WDM devices by a jumper optical fiber.

3. The WDM module of claim 1, further comprising one or more fiber reels positioned in the interior of the module body and configured to hold windings of one or more of the bandpass output optical fibers.

4. The WDM module of claim 1, wherein for each integrated connector-WDM device of the plurality of integrated connector-WDM devices, the connector interface of the housing is configured as a duplex connector interface.

5. The WDM module of claim 1, wherein for each integrated connector-WDM device of the plurality of integrated connector-WDM devices, the number of ferrules in the device is equal to the number of channel filters in the device.

6. A wavelength division multiplexing (WDM) module, comprising:
 a module body defining an interior;
 a bulkhead at a front portion of the module body, the bulkhead including one or more adapters defining a plurality of rear ports accessible from the interior of the module body and a plurality of front ports accessible from an exterior of the module body; and a plurality of integrated connector-WDM devices in the interior of the module body and connected to respective rear ports of the bulkhead, wherein each integrated connector-WDM device of the plurality of integrated connector-WDM devices comprises:

a housing defining a housing interior and including a connector interface having at least one ferrule;

a device input optical fiber extending from the housing and configured to carry an input optical beam having a plurality of optical signals each having a different wavelength;

a device output optical fiber extending from the housing and configured to carry an output optical beam having a plurality of optical signals each having a different wavelength; and a plurality of channel filters positioned in the housing interior, wherein a first channel filter of the plurality of channel filters is connected to the device input optical fiber, wherein a second channel filter of the plurality of channel filters is connected to the device output optical fiber;

wherein for each integrated connector-WDM device of the plurality of integrated connector-WDM devices, the connector interface of the housing is configured as a duplex connector interface; and wherein at least one of the plurality of channel filters is configured to separate at least one optical signal from the plurality of optical signals of the device input optical beam and provide the at least one optical signal to the at least one ferrule.

7. The WDM module of claim 6, wherein each of the plurality of WDM devices is connected to another of the plurality of WDM devices by a jumper optical fiber.

8. The WDM module of claim 6, further comprising a plurality of submodules positioned in the interior of the module body and including at least one input submodule and a plurality of WDM submodules, wherein the at least one input submodule includes a plurality of group bandpass filters, each of the plurality of group bandpass filters having a bandpass output optical fiber configured to carry an optical beam having a plurality of optical signals each of a different wavelength, wherein each of the plurality of WDM submodules includes at least one of the integrated connector-WDM devices, and wherein each of the bandpass output optical fibers is connected to a respective one of the plurality of WDM submodules.

* * * * *